(12) United States Patent
Friedmann et al.

(10) Patent No.: US 9,380,645 B2
(45) Date of Patent: Jun. 28, 2016

(54) COMMUNICATION PATHWAY SUPPORTING AN ADVANCED SPLIT MICROWAVE BACKHAUL ARCHITECTURE

(75) Inventors: Jonathan Friedmann, Tel-Aviv (IL); Igal Kushnir, Azur (IL); Alon Shavit, Kadima (IL); Noam Mizrahi, Hod Hasharon (IL)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/535,196

(22) Filed: Jun. 27, 2012

(65) Prior Publication Data

US 2013/0136163 A1    May 30, 2013

Related U.S. Application Data

(60) Provisional application No. 61/565,469, filed on Nov. 30, 2011.

(51) Int. Cl.
*H04B 1/38* (2015.01)
*H04W 88/08* (2009.01)

(52) U.S. Cl.
CPC .................................. *H04W 88/085* (2013.01)

(58) Field of Classification Search
CPC ...... H04B 1/38; H04L 25/0266; H04L 7/033; H04L 25/06; H04L 5/023; H04M 11/06
USPC ............. 375/220, 219; 455/73; 370/402, 425, 370/503
See application file for complete search history.

(56) References Cited

U.S. PATENT DOCUMENTS 5,548,807 A    8/1996    Ueda
5,640,691 A    6/1997    Davis et al.
(Continued)

FOREIGN PATENT DOCUMENTS

CN    1735999 A    2/2006
CN    101317332 A    12/2008
(Continued)

OTHER PUBLICATIONS

*CPRI Specification V5.0—Common Public Radio Interface (CPRI); Interface Specification*, Ericsson AB, Huawei Technologies Co. Ltd, NEC Corporation, Alcatel Lucent and Nokia Siemens Networks GmbH & Co. KG, pp. 1-119, Sep. 21, 2011.
(Continued)

*Primary Examiner* — Zewdu Kassa
(74) *Attorney, Agent, or Firm* — Sterne, Kessler, Goldstein & Fox, P.L.L.C.

(57) ABSTRACT

An advanced split ODU architecture is provided. The advanced architecture includes an indoor communication unit including a digital modem assembly configured to modulate and demodulate digital data, and also includes a digital interface module configured to transmit and/or receive the digital data, over a digital communication pathway, between the indoor communication unit and an external outdoor communication unit. The advanced architecture further includes an outdoor communication unit having a digital interface module configured to transmit and/or receive the digital data, over the digital communication pathway, between the outdoor communication unit and an external indoor communication unit, and also includes a digital to analog converter configured to convert the digital data to analog data and an analog to digital converter configured to convert the analog data to the digital data, and further includes an RF module configured to convert the analog data between a baseband and a radio frequency.

24 Claims, 5 Drawing Sheets

(56) References Cited

U.S. PATENT DOCUMENTS

| | | | |
|---|---|---|---|
| 6,144,165 A | 11/2000 | Liedenbaum | |
| 6,731,946 B1 | 5/2004 | Stanwood et al. | |
| 6,782,211 B1* | 8/2004 | Core | 398/205 |
| 7,643,512 B2 | 1/2010 | Gorsetman et al. | |
| 7,839,842 B2 | 11/2010 | Zhang et al. | |
| 7,856,048 B1 | 12/2010 | Smaini et al. | |
| 8,018,375 B1 | 9/2011 | Alexopoulos et al. | |
| 8,488,970 B2 | 7/2013 | Huang et al. | |
| 2003/0043077 A1 | 3/2003 | Alexopoulos et al. | |
| 2003/0137329 A1 | 7/2003 | Van Der Valk et al. | |
| 2003/0152140 A1 | 8/2003 | Antoniak | |
| 2003/0156668 A1 | 8/2003 | Atkinson et al. | |
| 2004/0106380 A1 | 6/2004 | Vassiliou et al. | |
| 2004/0203528 A1* | 10/2004 | Ammar et al. | 455/90.3 |
| 2005/0124307 A1 | 6/2005 | Ammar et al. | |
| 2006/0098614 A1 | 5/2006 | Moon et al. | |
| 2007/0069901 A1 | 3/2007 | Tuck et al. | |
| 2007/0129031 A1 | 6/2007 | Newton et al. | |
| 2008/0002581 A1* | 1/2008 | Gorsetman et al. | 370/232 |
| 2008/0014866 A1 | 1/2008 | Lipowski et al. | |
| 2008/0287076 A1 | 11/2008 | Shen et al. | |
| 2009/0115757 A1 | 5/2009 | Bae | |
| 2009/0124213 A1 | 5/2009 | Rubin et al. | |
| 2009/0152445 A1 | 6/2009 | Gardner, Jr. | |
| 2009/0168864 A1 | 7/2009 | Teramoto | |
| 2009/0232257 A1 | 9/2009 | Bury | |
| 2010/0067476 A1 | 3/2010 | Periyalwar et al. | |
| 2010/0272163 A1* | 10/2010 | Prager et al. | 375/220 |
| 2011/0051654 A1 | 3/2011 | Blankenship et al. | |
| 2011/0080985 A1 | 4/2011 | Secker et al. | |
| 2011/0286552 A1 | 11/2011 | Briand | |
| 2012/0083304 A1 | 4/2012 | Yang et al. | |
| 2012/0093100 A1 | 4/2012 | Qin et al. | |
| 2012/0100801 A1* | 4/2012 | Yuan et al. | 455/14 |
| 2012/0195392 A1* | 8/2012 | Kushnir et al. | 375/296 |
| 2012/0220246 A1 | 8/2012 | Kushnir et al. | |
| 2012/0307695 A1 | 12/2012 | Yehezkely et al. | |
| 2013/0094554 A1 | 4/2013 | Kennard et al. | |
| 2013/0113650 A1 | 5/2013 | Behbahani et al. | |
| 2013/0128936 A1 | 5/2013 | Kennard et al. | |
| 2013/0135985 A1 | 5/2013 | Friedmann et al. | |
| 2013/0135986 A1 | 5/2013 | Sturkovich et al. | |
| 2013/0136039 A1 | 5/2013 | Sturkovich et al. | |
| 2013/0137381 A1 | 5/2013 | Vassiliou et al. | |
| 2013/0178177 A1 | 7/2013 | Kushnir et al. | |

FOREIGN PATENT DOCUMENTS

| | | |
|---|---|---|
| CN | 101465705 A | 6/2009 |
| CN | 102255119 A | 11/2011 |
| EP | 1298848 A2 | 4/2003 |
| EP | 1 962 431 A1 | 8/2008 |
| EP | 2 299 775 A1 | 3/2011 |
| JP | 4462043 B2 | 2/2010 |
| JP | 2011/199880 A | 10/2011 |
| TW | I335156 B | 12/2010 |
| WO | WO 2004/064197 A1 | 7/2004 |
| WO | WO 2010/112061 A1 | 10/2010 |
| WO | WO 2011/032790 A1 | 3/2011 |

OTHER PUBLICATIONS

*IEEE Standard for Information Technology—Telecommunications and Information Exchange Between Systems—Local and Metropolitan Area Networks—Specific Requirements*, Version 802.3-2008 (Revision of 802.3-2005), Part 3: Carrier Sense Multiple Access with Collision Detection (CSMA/CD) Access Method and Physical Layer Specifications, Section 4, pp. 1-586, IEEE, Piscataway NJ, 2008.

Kuwano, S. et al., "Digitized Radio-over-Fiber (DROF) System for Wide-Area Ubiquitous Wireless Network," MWP '06: International Topical Meeting on Microwave Photonics, 4 pages, 2006.

Partial Search Report for European Application No. EP 12 00 6163, European Patent Office, Munich, Germany, 9 pages, mailed on Apr. 3, 2013.

Office Action for related Taiwanese Patent Application No. 101133022, mailed Mar. 24, 2014; 8 pages.

Office action directed to related Korean Patent Application No. 10-2012-0103653, mailed Apr. 22, 2014; 8 pages.

English-language Abstract of Japanese Patent No. 4462043 B2; 1 page.

Communication from the Examining Division of the European Patent Office, directed to related European Patent Application No. 12 006 163.5, mailed Mar. 11, 2014; 9 pages.

Office Action directed to related Chinese Patent Application No. 201210372182.6, mailed Jul. 2, 2014; 7 pages.

Office Action directed to related Taiwanese Patent Application No. 101133671, mailed Jul. 17, 2014; 6 pages.

"Fixed Radio Systems; Point-to-Point Equipment; Presenting Important Aspects of the Spatial Frequency Reuse Method; DTR/TM-4153", European Telecommunications Standards Institute, Nov. 23, 2006, Valbonne, France; pp. 1-35.

Office Action directed to related Taiwanese Patent Application No. 101140962, mailed Mar. 24, 2014; 8 pages.

Office Action directed to related Chinese Patent Application No. 201210501036.9, mailed Sep. 24, 2014; 8 pages.

European Search Report directed to related European Patent Application No. 13005543.7, mailed Mar. 4, 2014; 9 pages.

Office Action directed to European Patent Application No. 13005543.7, mailed Sep. 15, 2015; 14 pages.

English-Language Abstract for Chinese Patent Publication No. CN 101771441 A, published Jul. 7, 2010; 2 pages.

Office Action directed to related Chinese Patent Application No. 201210372182.6, mailed on Feb. 2, 2015; 8 pages.

\* cited by examiner

COMMUNICATION PATHWAY SUPPORTING AN ADVANCED SPLIT MICROWAVE BACKHAUL ARCHITECTURE

CROSS REFERENCE TO RELATED APPLICATIONS

This application claims the benefit of U.S. Provisional Patent Application No. 61/565,469, filed Nov. 30, 2011, which is incorporated herein by reference in its entirety.

BACKGROUND OF THE INVENTION

1. Field of the Invention

The invention generally relates to microwave backhaul architecture, and more specifically to an advanced split microwave backhaul architecture supporting a digital communication pathway.

2. Related Art

Conventional microwave backhaul architectures are generally implemented as either a split outdoor unit (split ODU) configuration or an all outdoor unit (all ODU) configuration. Conventional split ODU configurations are generally comprised of both an indoor unit (IDU) and an outdoor unit (ODU), where the IDU and the ODU are connected over a coaxial interconnect. The IDU in a conventional split ODU configuration typically includes a modem, a digital-to-analog converter and a baseband-to-intermediate frequency converter. Under normal operation, these conventional split ODU configurations generally involve transmitting an analog signal, at an intermediate frequency; over the coaxial interconnect between the IDU and the ODU. The use of a coaxial interconnect to transmit the analog signal between the IDU and ODU has a number of limitations. For example, the coaxial interconnect may be relatively expensive to implement, may have a limited bandwidth, and may experience signal loses under certain conditions.

Mobile backhaul providers are experiencing a growing demand for increased capacity as well as a shift from voice services to data services. These factors are driving mobile backhaul networks towards high capacity IP/Ethernet connections. Additionally, the transition to 4G and LTE networks is also driving the need for higher capacity, and moving more packet traffic onto mobile backhaul networks. As a result, the limitations of conventional split ODU configurations make it increasingly difficult to meet these increasing user demands.

In some instances, all ODU configurations have been used as an alternative to these conventional split ODU configurations. Conventional all ODU configurations include only an ODU, and thus do not include an IDU. The ODU therefore includes a modem, a digital-to-analog converter as well as a baseband-to-radio frequency converter. Implementing all of these functional components in the ODU typically allows for the implementation of digital connectivity within these conventional all ODU configurations. This is in contrast to the analog connectivity utilized in the conventional split ODU configurations. However, the conventional all ODU configurations also have limitations. For example, including all of this functionality in the ODU increases installation and repair costs, and may result in inefficient power consumption.

Thus, neither conventional split ODU configurations nor all ODU configurations effectively meet the increasing demands for capacity. Therefore, a need exists for an advanced split microwave backhaul architecture that overcomes the deficiencies of conventional architectures.

BRIEF DESCRIPTION OF THE DRAWINGS/FIGURES

Embodiments of the invention are described with reference to the accompanying drawings. In the drawings, like reference numbers indicate identical or functionally similar elements. Additionally, the left most digit(s) of a reference number identifies the drawing in which the reference number first appears.

FIG. 3.1 illustrates a block diagram of a split microwave backhaul system having an indoor communication unit (IDU), a plurality of outdoor communication units (ODUs) and a plurality of digital communication pathways according to an exemplary embodiment of the present invention.

FIG. 3.2 illustrates a block diagram of a split microwave backhaul system having a plurality of indoor communication units (IDUs), an outdoor communication unit (ODU) and a plurality of digital communication pathways according to an exemplary embodiment of the present invention.

DETAILED DESCRIPTION OF THE INVENTION

The following Detailed Description refers to accompanying drawings to illustrate exemplary embodiments consistent with the invention. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

An Exemplary Split Microwave Backhaul System

Figure 1:
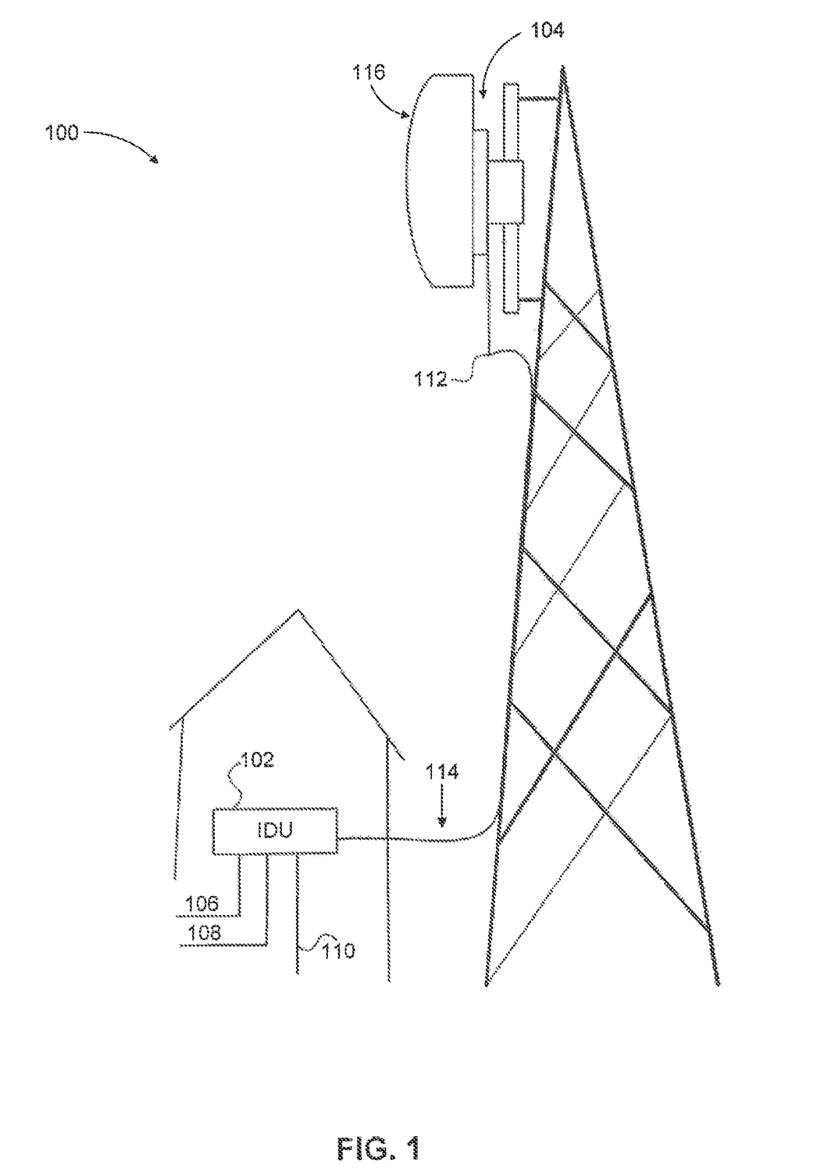
FIG. 1 illustrates a block diagram of a split microwave backhaul system according to an exemplary embodiment of the present invention.

FIG. 1 illustrates a block diagram of a split microwave backhaul system 100 that includes an indoor communication unit (IDU) 102 and an outdoor communication unit (ODU)

104 according to an exemplary embodiment of the present invention. Microwave, as used throughout this disclosure, refers to both terrestrial point-to-point radio communications, as well as point-to-multipoint communications.

Split microwave backhaul system 100 initiates communication by accessing an information source, which may comprise, for example, audio data 106, video data 108, or any other data capable of being transmitted over a high capacity IP/Ethernet connection 110. To facilitate this communication, IDU 102 is electrically connected to a core network. In particular, IDU 102 is configured to acquire one or more sequences of digital data (e.g., audio data 106, video data 108, data transmitted over a high capacity IP/Ethernet connection 110, or the like) from the core network. IDU 102 may also be configured to support several additional services, such as Ethernet, TDM, and control data that is aggregated over a radio link.

IDU 102 may be implemented at a location that is substantially removed from ODU 104, such as at a location at ground level. For example, IDU 102 may be positioned inside of a home or an office building, or the like. Conversely, ODU 104 may be implemented at a substantially elevated location, such as on top of a pole, on top of an antenna tower, or on top of a building. In some embodiments, IDU 102 and ODU 104 may be separated by a distance up to approximately 300 meters.

IDU 102 and ODU 104 are connected via a digital communication pathway 112, which is configured such that digital data 114 may be transmitted between IDU 102 and ODU 104. Digital communication pathway 112 may comprise an Ethernet cable, a fiber optic cable, a coaxial cable, a twisted pair cable, a shielding cable, a category 5 cable, a category 6 cable, or one or more copper wires. In some embodiments, digital communication pathway 112 may be a wireless communication channel. Additionally, an antenna 116 may be electrically connected to ODU 104, and may be positioned substantially close to ODU 104. Therefore, split microwave backhaul system 100 is implemented such that digital data 114 may be transmitted from IDU 102, across digital communication pathway 112, to ODU 104, and subsequently to antenna 116 where communication over a wireless link may then be initiated. Split microwave backhaul system 100 also is implemented such that digital data 114 received by antenna 116 may be transmitted from ODU 104 over digital communication pathway 112 to IDU 102.

Using digital transmission between the IDU and ODU (as opposed to the analog transmission of convention split ODU architecture) provides many advantages. First, transmitting digital data 114 over digital communication pathway 112 provides for more efficient communication between IDU 102 and ODU 104. In particular, transmitting digital data 114 over digital communication pathway 112 (e.g., an Ethernet cable) offers a higher bandwidth (e.g., a bandwidth in the range of approximately 2.5 Gbps to approximately 10 Gbps). Second, transmitting digital data 114 over digital communication pathway 112 reduces signal loses and may be less expensive to implement than compared to the transmission of an analog signal. Specifically, the signal loses generally associated with the transmission of analog signals may be eliminated because the transmission of digital data 114 may be adjusted to cancel out any signal loses. Finally, the advanced split microwave backhaul system 100 may also be configured to support adaptive coding and modulation (ACM), which provides high survivability of digital communication pathway 112 even in extreme weather.

Split microwave backhaul system 100 is also configured to provide a high mean time between failures (MTBF), which refers to the predicted elapsed time between inherent failures of a system during operation. Split microwave backhaul system 100 may also be implemented using existing infrastructure (e.g., Ethernet or other existing technology), thus aiding in reducing the expenditures associated with split microwave backhaul system 100. However, it will be apparent to those skilled in the related art(s) that other advantages may be realized without departing from the spirit and scope of the present disclosure.

Although the invention is described in terms of wired backhaul architecture, those skilled in the relevant art(s) will recognize that the present invention may be applicable to other architectures that use wireless or other wired communication methods without departing from the spirit and scope of the present invention.

An Exemplary Indoor Unit (IDU) and Outdoor Unit (ODU)

In embodiments of the present invention, specific functionality is offloaded from ODU 104 to IDU 102. The offloading of functionality provides numerous advantages for split microwave backhaul system 100 over conventional split ODU configurations. For example, as more functionality is implemented within IDU 102, as opposed to ODU 104, power consumption by split microwave backhaul system 100 may become more efficient. Similarly, it may be easier, and less expensive, to convey power to IDU 102 than ODU 104 because IDU 102 may be located at ground level, while ODU 104 may be located at an elevated level (e.g., on top of the pole, antenna tower, or the like). Thus, when more of these functional components are implemented in IDU 102 rather than ODU 104, the necessary power may be supplied to the aforementioned functional components at a lower cost.

An additional advantage of offloading functionality from ODU 104 to IDU 102 may be a reduction in both installation and repair costs. A significant portion of the expenditures associated with typical split ODU configurations are derived from installation costs. In particular, it may be difficult to transport all of the necessary equipment to the physical location of the ODU, which may be at an elevated location and thus may be difficult to reach. Similarly, the probability that an ODU will need repairs substantially increases as the number of functional components implemented in the ODU increases. With typical split ODU configurations, repair costs are generally high as well, because when the ODU does need to be repaired, it may be expensive to employ a skilled technician to climb to the ODU's elevated location to execute the repairs. Therefore, because a substantial portion of the required functionality may be offloaded from ODU 104 to IDU 102, split microwave backhaul system 100 may be implemented and maintained at a relatively low cost.

Figure 2:
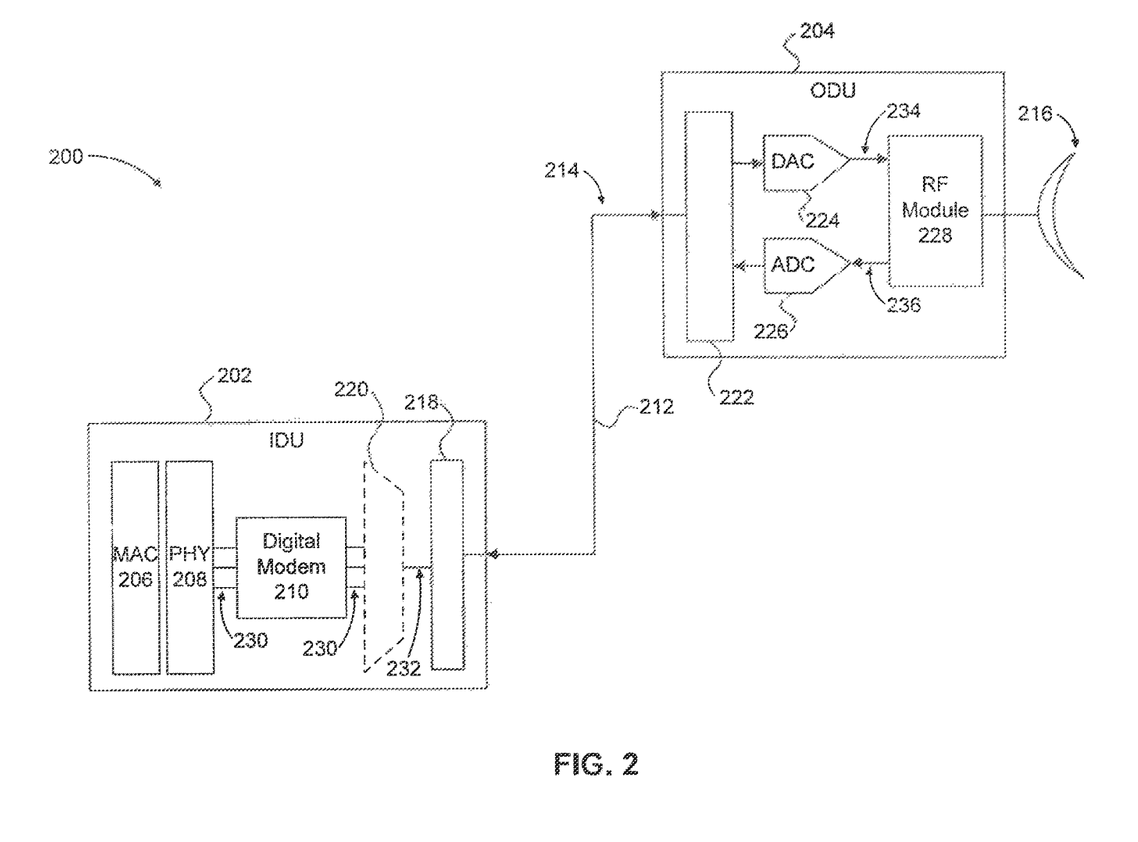
FIG. 2 illustrates a block diagram of a split microwave backhaul system having an indoor communication unit (IDU), an outdoor communication unit (ODU) and an associated digital communication pathway according to an exemplary embodiment of the present invention.

FIG. 2 illustrates a block diagram of a an advanced split microwave backhaul system 200 according, to an exemplary embodiment of the present invention. System 200 includes an indoor communications unit (IDU) 202 coupled via a digital communications pathway 212 to an outdoor communications unit (ODU) 204. IDU 202 may represent an exemplary embodiment of IDU 102, and ODU 204 may represent an exemplary embodiment of ODU 104.

IDU 202 includes a digital modem assembly 210 and a digital interface module 218. Digital modem assembly 210 and digital interface module 218 are configured to prepare digital data 214 to be transmitted to, and received from, ODU 204.

Additionally, IDU 202 includes a media access control layer (MAC) 206 and a physical layer (PHY) 208. MAC 206 is configured to provide addressing and channel access control mechanisms that make it possible for several terminals or network nodes to communicate within a multiple access network that incorporates a shared medium (e.g. Ethernet). PHY 208 defines the means of transmitting raw bits rather than logical data packets over digital communication pathway 212 connecting IDU 202 and ODU 204. In particular, the bit stream may be grouped into code words or symbols and converted to digital data packets that may then be transmitted over digital communication pathway 212.

Digital modem assembly 210 is electrically connected to PHY 208, such that digital modem assembly 210 may transmit and/or receive one or more digital data packets 230 from PHY 208. Digital modem assembly 210 is configured to perform modulation and demodulation of the one or more digital data packets 230. In some embodiments, digital modem assembly 210 may function substantially as a baseband modem. Further, when implementing digital modem assembly 210 in IDU 202, any noise associated with IDU 202 or digital communication pathway 212 may be cancelled.

Figure 31:
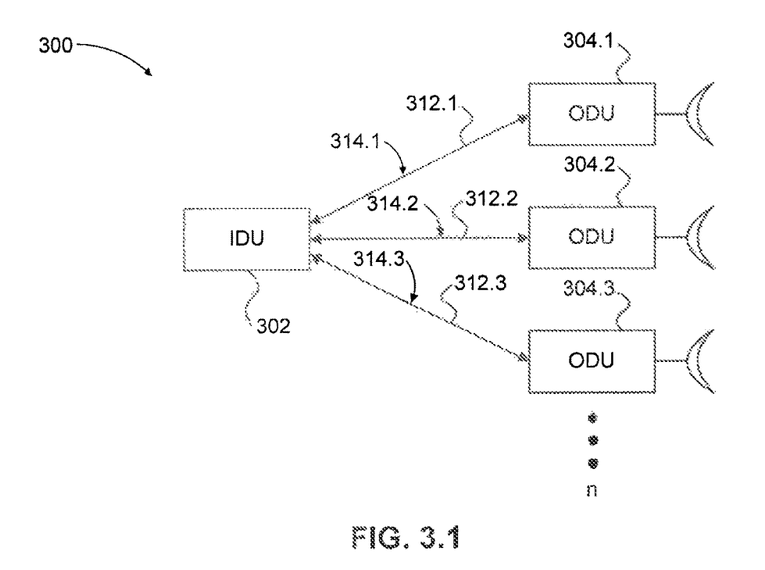

IDU 202 may also include a multiplexer (MUX) 220, which may be electrically connected to digital modem assembly 210. MUX 220 may be configured to transmit and/or receive one or more digital data packets 230 from digital modem assembly 210. MUX 220 may be further configured to select one of the one or more digital data packets 230, and to output a selected digital data packet 232 to first digital interface module 218. Similarly, MUX 220 may be configured to select one received digital data packet from a plurality of received digital data packets (see FIG. 3.1), and to output the selected received digital data packet to digital modem assembly 210. Thus, MUX 220 may be configured to increase the amount of data that can be sent over the network within a certain amount of time and bandwidth. Further, MUX 220 may allow for one or more digital data packets 230 to share the single digital communication pathway 212. In an embodiment, MUX 220 may be implemented as part of digital modem assembly 210. For example, digital modem assembly 210 may operate as a "smart chip," such that digital modem assembly 210 not only modulates/demodulates one or more digital data packets 230, but also multiplexes one or more digital data packet 230. As discussed above, one or more digital data packets 230 may include audio data, video data, Ethernet, or TDM, to provide some examples; however other types of data are also possible without departing from the spirit and scope of the present disclosure. Therefore, implementing MUX 220 within IDU 202 eliminates the need to run multiple transmission lines between IDU 202 and ODU 204, which may also reduce expenditures associated with the advanced split microwave backhaul system 200.

Digital interface module 218 may be configured to transmit and/or receive selected digital data packet 232 from MUX 220, and to prepare selected digital data packet 232 to be transmitted over digital communication pathway 212 as digital data 214. In an embodiment where IDU 202 does not include MUX 220, or where MUX 220 is implemented inside of digital modem assembly 210, then digital interface module 218 may be configured to transmit and/or receive selected digital data packet 232 from digital modem assembly 210. Thus, digital interface module 218 is configured to facilitate proper transmission to, and reception from, ODU 204 of digital data 214 over digital communication pathway 212.

ODU 204 includes a digital interface module 222, a digital-to-analog converter (DAC) 224, an analog-to-digital converter (ADC) 226 and an RF module 228. The digital interface module 222 of the ODU may function substantially similar to digital interface module 218 of the IDU. In particular, digital interface module 222 is configured to facilitate proper transmission to, and reception from, IDU 202 of digital data 214 over digital communication pathway 212. Digital interface module 222 is also configured to transmit the received digital data 214 to DAC 224 and to receive digital data 214 from ADC 226.

DAC 224 is configured to convert digital data 214 to first analog data 234 and ADC is configured to convert second analog data 236 to digital data 214. Both DAC 224 and ADC 226 are electrically connected to RF module 228.

RF module 228 is configured to receive first analog data 234 from DAC 224. RF module 228 is also configured to perform a frequency conversion of first analog data 234. When first analog data 234 is received at RF module 228, first analog data 234 may have a frequency residing in the baseband. Therefore, RF module 228 may up-convert analog data 234 from baseband to a radio frequency (RF) such that analog data 234 may be transmitted over a wireless link. RF module 228 then transmits analog signal 234 to an antenna 216, which may be configured to transmit analog data 234, having a radio frequency, over the wireless link. RF module 228 may also be configured to down-convert analog data 236 after it has been received over the wireless link via antenna 216. In particular, RF module 228 may down-convert received analog data 236 from a radio frequency to baseband, such that second analog data 236 may be converted to digital data 214 at ADC 226.

In addition to allocating the aforementioned functional components between IDU 202 and ODU 204 as described herein, further communication interface circuitry may also be offloaded from ODU 204 to IDU 202. For example, after offloading additional communication interface circuitry to IDU 202, ODU 204 may simply include a low noise amplifier (LNA), a power amplifier (PA), a duplexer, and an optical-to-electrical and an electrical-to-optical converter. Therefore, communication interface circuitry such as an N-plexer, one or more synthesizers, and one or more baseband components may be offload from ODU 204.

IDU 202 and ODU 204 are presented for illustrative purposes only, and as will be apparent to those skilled in the relevant art(s), both IDU 202 and ODU 204 may comprise additional functionality without departing from the spirit and scope of the present disclosure. Additionally, each of the aforementioned functional components implemented in both IDU 202 and ODU 204 are bidirectional.

Digital communication pathway 212 may also be configured to operate as a time shared or frequency shared pathway, such that a transmission signal and a reception signal may travel over the single digital communication pathway 212. For example, digital communication pathway 212 may be configured to support time-division multiplexing (TDM), time division multiple access (TDMA) or frequency-division duplexing (FDD); however other communication schemes are possible without departing from the spirit and scope of the present disclosure. Digital communication pathway 212 may also comprise multiple dedicated transmission and reception pathways. Therefore, digital communication pathway 212 may be configured as a dual channel configuration either using adjacent channels, a dual channel over a single cable, or non-adjacent channels. This dual channel configuration may enable digital communication pathway 212 to perform single chip cross polarization interference cancellation (XPIC) to further increase its transmission capacity.

In some embodiments, an optic feedback loop may be established over digital communication pathway 212 for digital predistortion purposes. In particular, an adaptive digital predistortion scheme may be established over digital communication pathway 212 to improve split microwave backhaul system 100's output power and power consumption.

In an embodiment, split microwave backhaul system 100 may be configured to have high capacity characteristics. For example, split microwave backhaul system 100 may support frequencies in the range of approximately 5.92 GHz to approximately 43.5 GHz; however, other frequency ranges may be possible without departing from the spirit and scope of the present disclosure. Split microwave backhaul system 100 may also support modulation schemes of up to approximately 2048QAM. Further, digital communication pathway 212 may have a link capacity of approximately 112 MHz.

An Exemplary Split Microwave Backhaul System

FIG. 3.1 illustrates a block diagram of a split microwave backhaul system 300 according to an exemplary embodiment of the present invention. System 300 includes an indoor communication unit (IDU) 302 coupled via a plurality of digital communication pathways 312.1, 312.2 and 312.3 to a plurality of outdoor communication units (ODUs) 304.1, 304.2 and 304.3. IDU 302 may represent an exemplary embodiment of IDU 202, and ODUs 304.1, 304.2 and 304.3 may each represent an exemplary embodiment of ODU 204.

IDU 302 may be configured to transmit and/or receive digital data 314.1, 314.2 and 314.3 via multiple digital communication pathways 312.1, 312.2 and 312.3, respectively. Digital communication pathways 312.1, 312.2 and 312.3 may each function substantially similar to digital communication pathway 212. In particular, each digital communication pathway 312.1, 312.2 and 312.3 may be configured to have a dual channel configuration and may operate as a time shared or frequency shared pathway. Upon reception of one or more of digital data 314.1, 314.2 and 314.3, IDU 302's digital interface module 218 (see FIG. 2) may output one or more digital data 314.1, 314.2 and 314.3 individually to MUX 220 (see FIG. 2). MUX 220 may then be configured to select one of the one or more digital data 314.1, 314.2 and 314.3, and to output the selected digital data to digital modem assembly 210 (see FIG. 2). Additionally, prior to transmission of one or more of digital data 314.1, 314.2 and 314.3, MUX 220 may take a single digital input and select one of digital communication pathways 312.1, 312.2 or 312.3 to transmit the single digital input over.

MUX 220 may be implemented either before or after digital interface module 218. MUX 220 may also be implemented as part of digital interface module 218 or as part of digital modem assembly 210. In some embodiments, IDU 302 may not include MUX 220. For example, digital data 314.1, 314.2 and 314.3 may each be individually communicated between PHY 208 (see FIG. 2) and their respective ODUs 304.1, 304.2 and 304.3.

Digital data 314.1, 314.2 and 314.3 may each comprise substantially similar data to be communicated between IDU 302 and ODUs 304.1, 304.2 and 304.3, respectively. Digital data 314.1, 314.2 and 314.3 may also each comprise different data. For example, desired data may be allocated to each digital data 314.1, 314.2 and 314.3 based on a time that the desired data is to be transmitted, a relative size of the desired data, a frequency of the desired data, or the like. Further, digital data 314.1, 314.2 and 314.3 may each communicate a different signal type, which may be chosen from the a transmit signal, a receipt signal, a transmit control, a receipt control, or a DC signal, to provide some examples.

Figure 32:
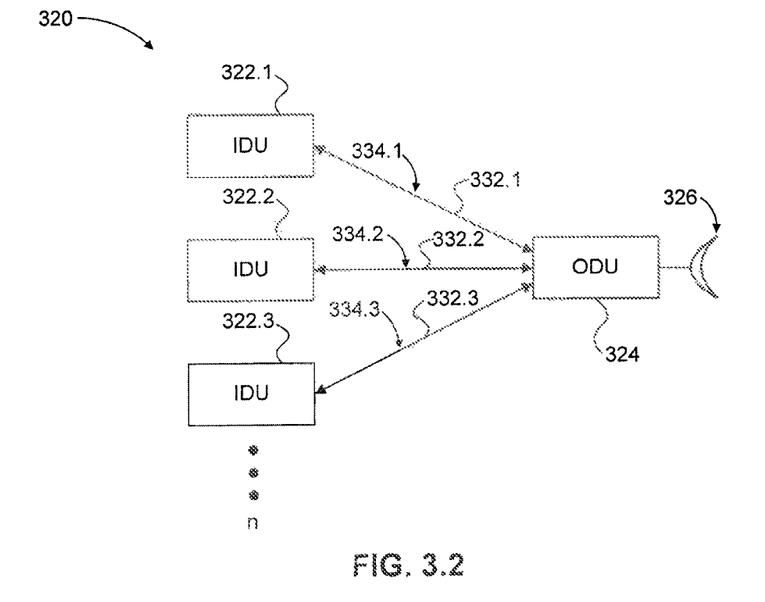

Referring also to FIG. 3.2 a block diagram of a split microwave backhaul system 320 having a plurality of indoor communication units (IDUs) 322.1, 322.2 and 322.3, an outdoor communication unit (ODU) 324 and a plurality of digital communication pathways 332.1, 332.2 and 332.3 according to an exemplary embodiment of the present invention is shown. IDU 322.1, 322.2 and 322.3 may each represent an exemplary embodiment of IDU 202, and ODU 324 may represent an exemplary embodiment of ODU 204.

ODU 324 may be configured to transmit and/or receive digital data 334.1, 334.2 and 334.3 via multiple digital communication pathways 332.1, 332.2 and 332.3, respectively. Digital communication pathways 312.1, 312.2 and 312.3 may each represent an exemplary embodiment of digital communication pathways 312.1, 312.2 and 312.3, respectively. ODU 324 may include a second MUX, which performs substantially similar to MUX 220. In particular, upon reception of one or more of digital data 334.1, 334.2 and 334.3, second digital interface module 222 (see FIG. 2) may output one or more digital data 334.1, 334.2 and 334.3 individually to the second MUX. The second MUX may be configured to select one of the one or more digital data 334.1, 334.2 and 334.3, and to output the selected digital data to DAC 224 (see FIG. 2). Additionally, prior to transmission of one or more of digital data 334.1, 334.2 and 334.3, the second MUX may take a single digital input from ADC 226 (see FIG. 2) and select one of digital communication pathways 332.1, 332.2 or 332.3 to transmit the single digital input over.

The second MUX may be implemented at any location in ODU 324. Additionally, depending on where the second MUX is implemented in ODU 324, each of the functional components contained in the ODU 324 may be configured to both input and/or output one or more digital data 334.1, 334.2 and 334.3 individually. The second MUX may also be configured to output digital data 334.1, 334.2 and 334.3 to ADC 226 and to input digital data from DAC 224. The second MUX may also be implemented as part of second digital interface module 222 or as part of RF module 228. ODU 324 may also include two separate second MUXs, where one of the second MUXs is electrically connected to DAC 224, and the other second MUX is electrically connected to ADC 226. In some embodiments, ODU 324 may not include the second MUX. For example, digital data 334.1, 334.2 and 334.3 may each be individually communicated between antenna 326 and their respective IDUs 322.1, 322.2 and 322.3.

ODUs 304.1, 304.2 and 3.04.3 and IDUs 322.1, 322.2 and 322.3 are provided for illustrative purposes only, and are not intended to be the only ODUs and IDUs capable of being used herein, and is not meant to limit this disclosure. In particular, any number of ODUs and IDUs may be connected to a single corresponding IDU and ODU without departing from the spirit and scope of the present disclosure.

An Exemplary Method of Communicating a Signal Between an Indoor Unit (IDU) and an Outdoor Unit (ODU)

Figure 4:
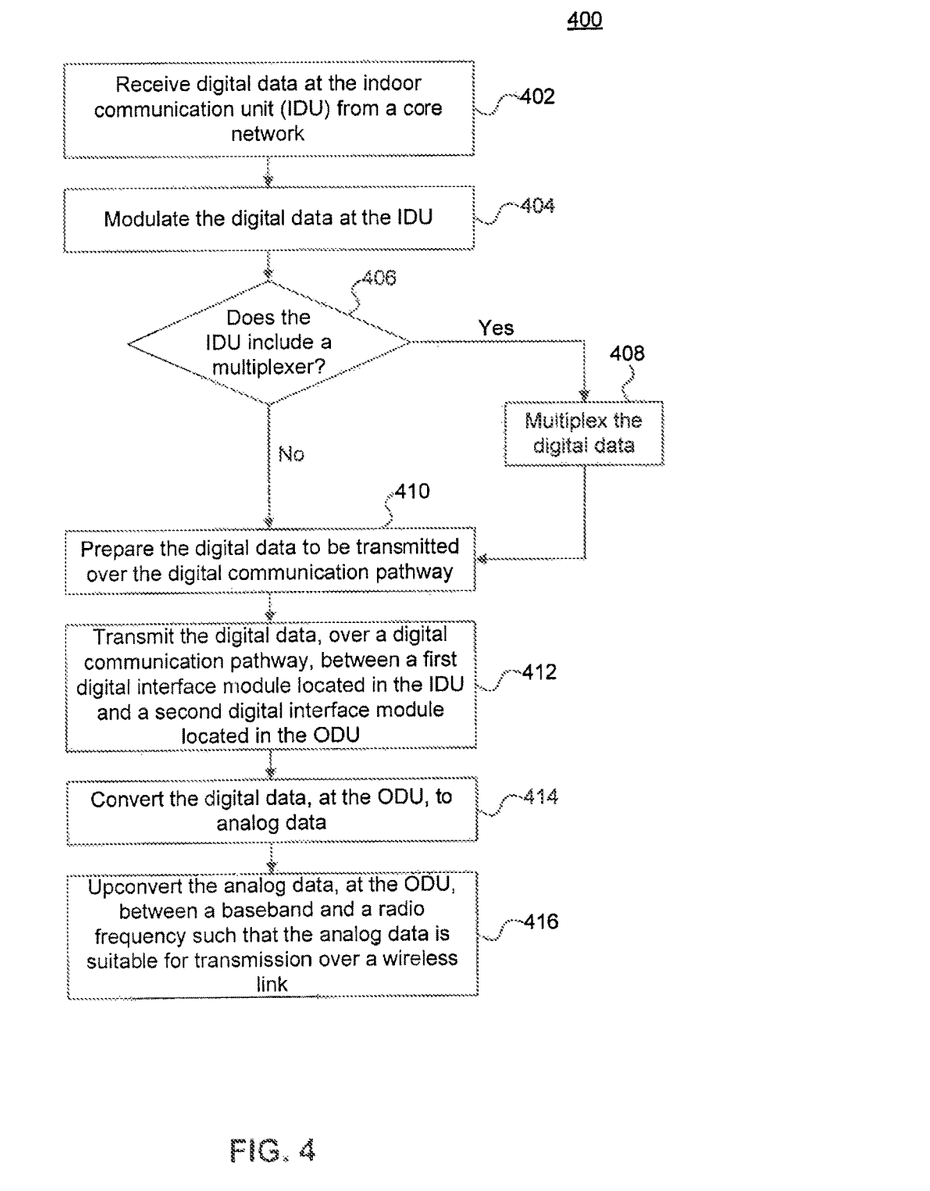
FIG. 4 is a flowchart of exemplary operational steps of communicating a signal between an indoor communication unit (DU) and an outdoor communication unit (ODU) according to an exemplary embodiment of the present invention.

FIG. 4 is a flowchart of exemplary method for communicating a signal between an indoor communication unit (IDU) and an outdoor communication unit (ODU) according to an exemplary embodiment of the present invention. The flowchart of FIG. 4 is described with reference to embodiments of FIG. 2. However, a method 400 is not limited to these embodiments.

Method 400 begins at step 402 where digital information is received at IDU 202 from a core network. The digital information may comprise audio data, video data, and/or any other data capable of being transmitted over a high capacity IP/Ethernet connection. The digital information passes through MAC 206 and PHY 208, which groups the digital information into code words or symbols and converts the digital information to digital data packets 230 that are capable of being transmitted over digital communication pathway 212.

In step 404, digital data packets 230 are modulated by digital modem assembly 210.

In step 406, a decision is made as to whether IDU 202 includes MUX 220. If IDU includes MUX 220, then the method proceeds to step 408. If IDU 202 does not include MUX 220, then digital data packets 230 are transmitted from digital modem 210 to first digital interface module 218.

In step 408, digital data packets 230 are multiplexed or demultiplexed and transmitted to first digital interface module 218.

In step 410, first digital interface module 218 prepares digital data packets 230 to be transmitted over digital communication pathway 212 as digital data 214.

In step 412, digital data 214 is transmitted over digital communication pathway 212 between the digital interface module 218 of the IDU and the digital interface module 222 of the ODU. Digital interface module 222 then transmits digital data 214 to DAC 224.

In step 414, digital data 214 is converted to first analog data 234 by DAC 224.

In step 416, first analog data 234 is upconverted, by RF module 228, from baseband to a radio frequency. The upconversion is performed such that first analog signal may be transmitted over a wireless link via antenna 216.

Figure 5:
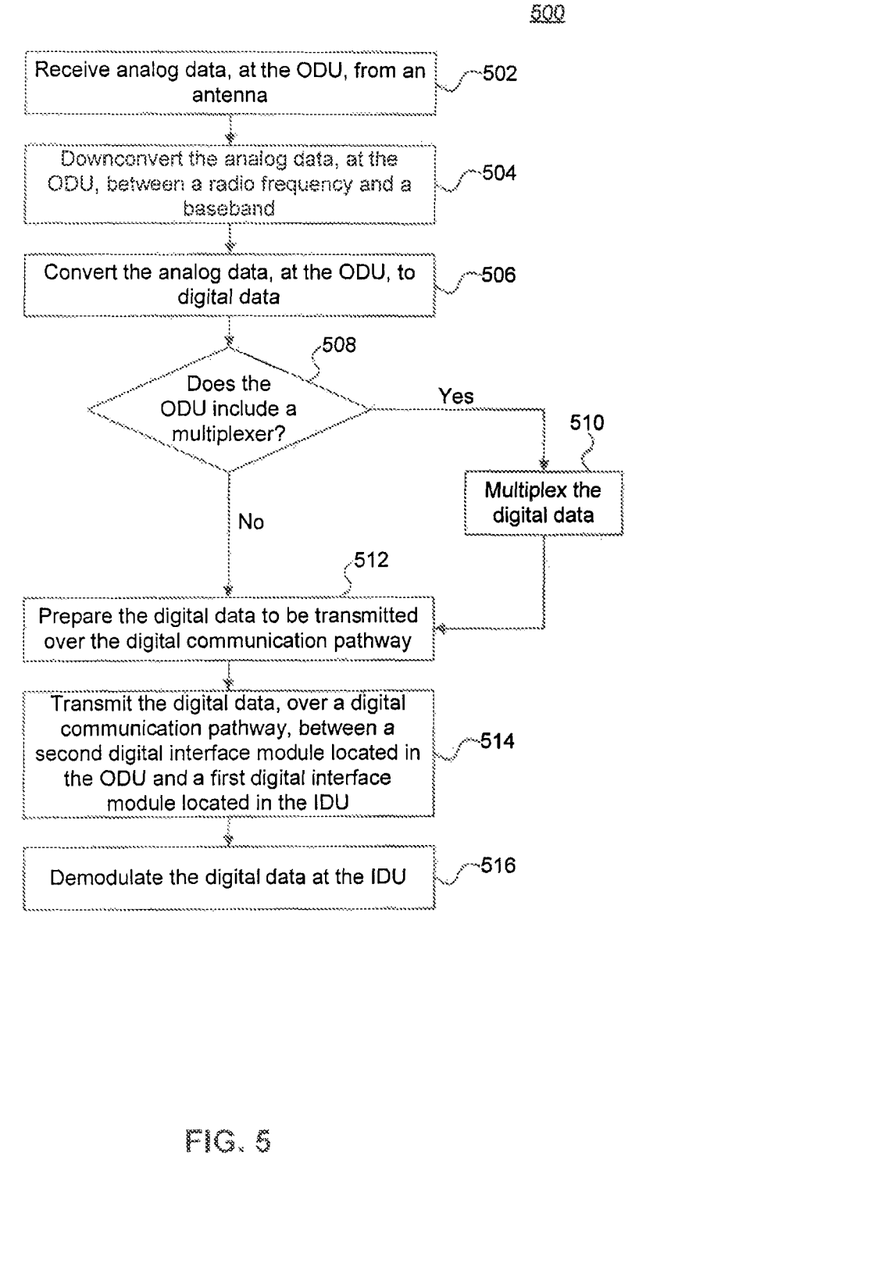
FIG. 5 is a flowchart of exemplary operational steps of communicating a signal between an indoor communication unit (IDU) and an outdoor communication unit (ODU) according to an exemplary embodiment of the present invention Embodiments of the invention will now be described with reference to the accompanying drawings. In the drawings, like reference numbers generally indicate identical, functionally similar, and/or structurally similar elements. The drawing in which an element first appears is indicated by the leftmost digit(s) in the reference number

FIG. 5 depicts a flowchart of a method for communicating a signal between an indoor communication unit (IDU) and an outdoor communication unit (ODU) according to an exemplary embodiment of the present invention. The flowchart of FIG. 5 is described with reference to embodiments of FIG. 2. However, a method 500 is not limited to these embodiments.

Method 500 begins at step 502 where analog data 236 is received from antenna 216, after being transmitted over a wireless link.

In step 504, received analog data 236 is downconverted, by RF module 228, from a radio frequency to baseband. The downconversion is performed such that a digital-to-analog conversion may be performed on second analog data 236.

In step 506, analog data 236 is converted to digital data 214 by ADC 226.

In step 508, a decision is made as to whether ODU 204 includes a second MUX. If ODU 204 includes the second MUX, then the method proceeds to step 510. If the ODU 204 does not include the second MUX, then digital data 214 is transmitted from ADC 226 to digital interface module 222.

In step 510, digital data 214 is multiplexed or demultiplexed and transmitted to second digital interface module 222.

In step 512, the digital interface module of ODU 222 prepares digital data 214 to be transmitted over digital communication pathway 212.

In step 514, digital data 214 is transmitted over digital communication pathway 212 between the digital interface module 222 of ODU 204 and the digital interface module 218 of IDU 202. Digital interface module 218 then transmits digital data 214 to digital modem 210 as digital packets 230.

In step 516, the digital data packets 230 are demodulated by digital modem assembly 210 such that digital packets 230 may later be communicated to the core network.

CONCLUSION

The exemplary embodiments described herein are provided for illustrative purposes, and are not limiting. Other exemplary embodiments are possible, and modifications may be made to the exemplary embodiments within the spirit and scope of the invention. Therefore, the Detailed Description is not meant to limit the invention. Rather, the scope of the invention is defined only in accordance with the following claims and their equivalents.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

It is to be appreciated that the Detailed Description section, and not the Abstract section, is intended to be used to interpret the claims. The Abstract section may set forth one or more, but not all exemplary embodiments, of the invention, and thus, are not intended to limit the invention and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the invention. Thus the invention should not be limited by any of the above-described exemplary embodiments, but should be defined only in accordance with the following claims and their equivalents.

What is claimed is:

1. An indoor communication unit in a split backhaul configuration, comprising:
    a digital modem assembly configured to modulate and demodulate digital data; and
    a digital interface module coupled to the digital modem assembly configured to communicate the digital data, over a digital communication pathway residing in a backhaul, between the indoor communication unit and an external outdoor communication unit, wherein both the indoor and outdoor communication units reside in the backhaul, and wherein the wireless digital communication pathway is configured to perform as an optic feedback loop for digital predistortion purposes.

2. The indoor communication unit of claim 1, further comprising a multiplexer unit.

3. The indoor communication unit of claim 1, wherein the digital communication pathway is configured to perform as a dual channel pathway.

4. The indoor communication unit of claim 1, wherein the wireless digital communication pathway is configured to support a bandwidth in the range of approximately 2.5 Gbps to approximately 10 Gbps.

5. The indoor communication unit of claim 1, wherein the wireless digital communication pathway is a time shared and frequency shared pathway.

6. The indoor communication unit of claim 1, further comprising one or more additional digital communication pathways, each additional digital communication pathway configured to communicate the digital data between the indoor communication unit and the outdoor communication unit and one or more additional outdoor communication units.

7. The indoor communication unit of claim 2, wherein the digital modem assembly, the digital interface module and the multiplexer unit are each bidirectional.

8. The indoor communication unit of claim 1, wherein the wireless digital communication pathway is configured to support adaptive coding and modulation (ACM).

9. The indoor communication unit of claim 1, wherein the wireless digital communication pathway is configured to perform single chip cross polarization cancellation (XPIC).

10. The indoor communication unit of claim 6, wherein the outdoor communication unit and the one or more additional outdoor communication units are communicatively independent from each other.

11. A split backhaul communication system, comprising:
an outdoor communication unit, comprising:
a digital interface module configured to communicate digital data, over a wireless digital communication pathway, between the outdoor communication unit and an external indoor communication unit;
a digital to analog converter coupled to the digital interface module;
an analog to digital converter; and
an RF module configured to convert the analog data from a baseband frequency to a radio frequency; and
an indoor communication unit; comprising:
a digital modem assembly configured to modulate and demodulate the digital data; and
a second digital interface module coupled to the digital modem assembly;
wherein the indoor and outdoor communication units and the wireless digital communication pathway all reside in a backhaul, and wherein the wireless digital communication pathway is configured to communicate the digital data between the indoor communication unit and the outdoor communication unit, and to function as an optic feedback loop for digital predistortion purposes.

12. The split backhaul communication system of claim 11, further comprising a multiplexer unit.

13. The split backhaul communication system of claim 10, wherein the digital communication pathway is configured to perform as a dual channel pathway.

14. The split backhaul communication system of claim 10, wherein the wireless digital communication pathway is a time shared and frequency shared pathway.

15. The split backhaul communication system of claim 10, further comprising one or more additional digital communication pathways, each additional digital communication pathway configured to communicate the digital data between the outdoor communication unit and the indoor communication unit and one or more additional indoor communication units.

16. The split backhaul communication system of claim 12, wherein the digital interface module, the digital to analog converter, the analog to digital converter, and the RF module are each bidirectional.

17. The split backhaul communication system of claim 11, wherein the wireless digital communication pathway is further configured to support adaptive coding and modulation (ACM).

18. The split backhaul communication system of claim 11, wherein the wireless digital communication pathway is further configured to perform single chip polarization cancellation (XPIC).

19. The split backhaul communication system of claim 15, wherein the indoor communication unit and the one or more additional indoor communication units are communicatively independent from each other.

20. A method for communicating data throughout a split microwave backhaul system, comprising:
receiving modulated digital data, over a digital communication pathway, at a first digital interface module located at an outdoor communication unit, from a second digital interface module located at an indoor communication unit, wherein the indoor and outdoor communication units and the wireless digital communication pathway all reside in a backhaul;
establishing an optic feedback loop over the wireless digital communication pathway;
performing an adaptive digital predistortion scheme over the optic feedback loop to improve output power and power consumption;
canceling out noise within the modulated digital data, at the outdoor communication unit, wherein the noise is associated with at least one of the indoor communication unit and the digital communication pathway;
converting the modulated digital data, at the outdoor communication unit, to analog data; and
upconverting the analog data, at the outdoor communication unit, from a baseband frequency to a radio frequency over a wireless link.

21. The method of claim 20, further comprising:
receiving the analog data, at the outdoor communication unit, from an antenna;
downconverting the analog data, at the outdoor communication unit, from a radio frequency to a baseband;
converting the analog data, at the outdoor communication unit, to digital data;
multiplexing the digital data; and
demodulating the digital data at the indoor communication unit.

22. The method of claim 20, wherein the modulated digital data is modulated at the indoor communication unit, and wherein the upconverted analog data is transmitted from an antenna, located at the outdoor communication unit, over a wireless link.

23. The method of claim 20, wherein the wireless digital communication pathway is configured to support adaptive coding and modulation (ACM).

24. The method of claim 20, wherein the wireless digital communication pathway is configured to perform single chip cross polarization cancellation (XPIC).

* * * * *